US011155014B2

(12) United States Patent
Anegawa et al.

(10) Patent No.: US 11,155,014 B2
(45) Date of Patent: Oct. 26, 2021

(54) INJECTION MOLDING APPARATUS AND INJECTION MOLDING METHOD

(71) Applicant: Seiko Epson Corporation, Tokyo (JP)

(72) Inventors: Kenta Anegawa, Matsumoto (JP); Seiichiro Yamashita, Azumino (JP); Kei Yokota, Matsumoto (JP); Mitsuru Inutsuka, Kawagoe (JP); Yusuke Watanabe, Shiojiri (JP); Kakeru Sasagawa, Matsumoto (JP); Yuichi Sasage, Suwa (JP)

(73) Assignee: Seiko Epson Corporation

( * ) Notice: Subject to any disclaimer, the term of this patent is extended or adjusted under 35 U.S.C. 154(b) by 166 days.

(21) Appl. No.: 16/516,349

(22) Filed: Jul. 19, 2019

(65) Prior Publication Data

US 2020/0023562 A1 Jan. 23, 2020

(30) Foreign Application Priority Data

Jul. 20, 2018 (JP) .............................. JP2018-136747

(51) Int. Cl.
*B29C 45/27* (2006.01)
*B29C 45/78* (2006.01)
*B29C 45/47* (2006.01)

(52) U.S. Cl.
CPC .......... *B29C 45/2737* (2013.01); *B29C 45/47* (2013.01); *B29C 45/78* (2013.01)

(58) Field of Classification Search
CPC .............................. B29C 45/2737; B29C 45/78
USPC ........................................................ 425/549
See application file for complete search history.

(56) References Cited

U.S. PATENT DOCUMENTS

| 5,804,228 | A | * | 9/1998 | Kofsman ............... B29C 45/278 264/328.15 |
| 5,902,541 | A | * | 5/1999 | Imai .................... B29C 45/1704 264/572 |
| 6,234,783 | B1 | | 5/2001 | Shibata et al. |
| 2002/0189781 | A1 | * | 12/2002 | Shibata ............... B22D 17/2038 164/113 |

(Continued)

FOREIGN PATENT DOCUMENTS

| CN | 200954534 Y | 10/2007 |
| CN | 205522260 U | 8/2016 |

(Continued)

*Primary Examiner* — Matthew J Daniels
*Assistant Examiner* — Wayne K. Swier
(74) *Attorney, Agent, or Firm* — Harness, Dickey & Pierce, P.L.C.

(57) ABSTRACT

An injection molding apparatus includes an injection-molding mold including a fixed mold and a movable mold, the fixed mold having a gate opening into which a molding material flows, the movable mold having a cavity and being configured to be separated from the fixed mold during mold opening; a hot runner including a nozzle having a channel that guides the molding material to the gate opening, and a heater, the hot runner being disposed in the fixed mold; and a control unit that controls a temperature of the heater to adjust a temperature of the hot runner. The control unit controls the temperature of the heater to a first temperature when the molding material is injected from the hot runner to the cavity, and after the injection of the molding material is completed, controls the temperature of the heater to a second temperature that is higher than the first temperature.

7 Claims, 8 Drawing Sheets

(56) References Cited

U.S. PATENT DOCUMENTS

| | | | |
|---|---|---|---|
| 2007/0077327 A1* | 4/2007 | Matsumoto | B29C 45/74 425/548 |
| 2014/0117576 A1* | 5/2014 | Hanaoka | B29C 45/2669 264/69 |
| 2014/0302192 A1* | 10/2014 | Spuller | B29C 45/278 425/549 |
| 2016/0039162 A1* | 2/2016 | Murphy | B29C 45/04 521/170 |
| 2016/0151948 A1* | 6/2016 | Jenko | B29C 45/2737 425/549 |
| 2017/0210069 A1 | 7/2017 | Stubenruss | |
| 2017/0259481 A1* | 9/2017 | Slisse | B29C 45/2737 |

FOREIGN PATENT DOCUMENTS

| | | |
|---|---|---|
| CN | 106573405 A | 4/2017 |
| JP | S61-201818 U | 12/1986 |
| JP | S63-025141 B2 | 5/1988 |
| JP | H08-164544 A | 6/1996 |
| JP | H11-291290 A | 10/1999 |
| JP | 2005-125586 A | 5/2005 |
| JP | 2009-137260 A | 6/2009 |

\* cited by examiner

INJECTION MOLDING APPARATUS AND INJECTION MOLDING METHOD

The present application is based on, and claims priority from, JP Application Serial Number 2018-136747, filed Jul. 20, 2018, the disclosure of which is hereby incorporated by reference herein in its entirety.

BACKGROUND

1. Technical Field

The present disclosure relates to injection molding.

2. Related Art

An injection molding apparatus that injects a molding material such as a thermoplastic resin from a nozzle into a mold has been known, as described in JP-A-2009-137260.

In an injection molding apparatus that includes a hot runner and performs molding in a state in which the runner is heated, a nozzle of the hot runner may have an open gate structure. With the open gate structure, a gate opening is constantly open. The molding material is not cut and the uncut molding material may cause occurrence of cobwebbing. The present application aims at suppressing occurrence of cobwebbing.

SUMMARY

An aspect of the disclosure provides an injection molding apparatus. The injection molding apparatus includes an injection-molding mold including a fixed mold and a movable mold, the fixed mold having a gate opening into which a molding material flows, the movable mold having a cavity and being configured to be separated from the fixed mold during mold opening; a hot runner including a nozzle having a channel that guides the molding material to the gate opening, and a heater, the hot runner being disposed in the fixed mold; and a control unit that controls a temperature of the heater to adjust a temperature of the hot runner. The control unit controls the temperature of the heater to a first temperature when the molding material is injected from the hot runner to the cavity, and after the injection of the molding material is completed, controls the temperature of the heater to a second temperature that is higher than the first temperature. A gap between the nozzle and the gate opening when the temperature of the heater is controlled to the second temperature is narrower than the gap when the temperature of the heater is controlled to the first temperature.

DESCRIPTION OF EXEMPLARY EMBODIMENTS

A. First Embodiment

A-1. Apparatus Configuration

Figure 1:
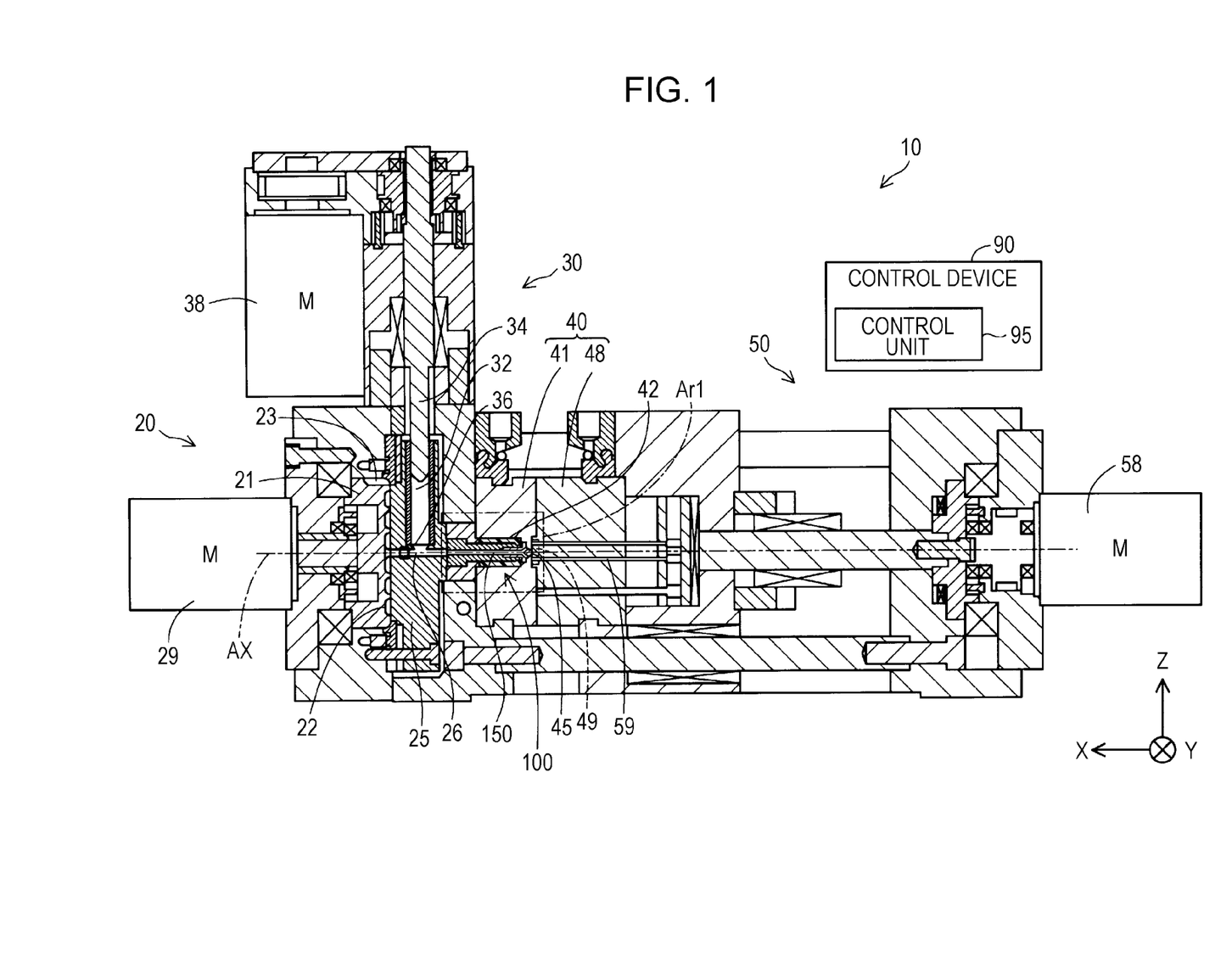
FIG. 1 is a sectional view illustrating an outline configuration of an injection molding apparatus according to an embodiment of the disclosure.

FIG. 1 is a sectional view illustrating an outline configuration of an injection molding apparatus 10 according to an embodiment of the disclosure. FIG. 1 schematically illustrates a section including an axis AX of a channel 150 formed in a hot runner 100, the section being obtained by cutting the injection molding apparatus 10 along the vertical direction. FIG. 1 illustrates the X axis, Y axis, and Z axis orthogonal to one another. The +Z direction corresponds to the vertically upward direction. The axis AX is parallel to the X axis. The X axis, Y axis, and Z axis in FIG. 1 correspond to the X axis, Y axis, and Z axis in the other drawings. The injection molding apparatus 10 injects a molding material such as a thermoplastic resin into a mold and manufactures a molded product. The injection molding apparatus 10 includes a material formation unit 20, an injection unit 30, an injection-molding mold 40, a mold opening/closing unit 50, and a control device 90.

The material formation unit 20 plasticizes and melts at least a portion of a solid material supplied from a hopper (not illustrated) disposed vertically above the material formation unit 20, hence forms a molding material having fluidity, and supplies the molding material toward the injection unit 30. The solid material, in a granular form, such as pellets or powder, is input to the hopper. The material formation unit 20 has a flat screw 21, a screw facing member 25, and a driving motor 29.

The flat screw 21 has a substantially columnar external shape having a smaller length along the axis AX than the diameter of the flat screw 21. The flat screw 21 is disposed such that the axis AX of the channel 150 formed in the hot runner 100 agrees with the axis AX of the flat screw 21. The flat screw 21 has a groove 22 at an end surface 11 thereof facing the screw facing member 25, and a material inlet 23 at an outer peripheral surface thereof. The groove 22 is continuous to the material inlet 23. The material inlet 23 receives the solid material supplied from the hopper.

Figure 2:
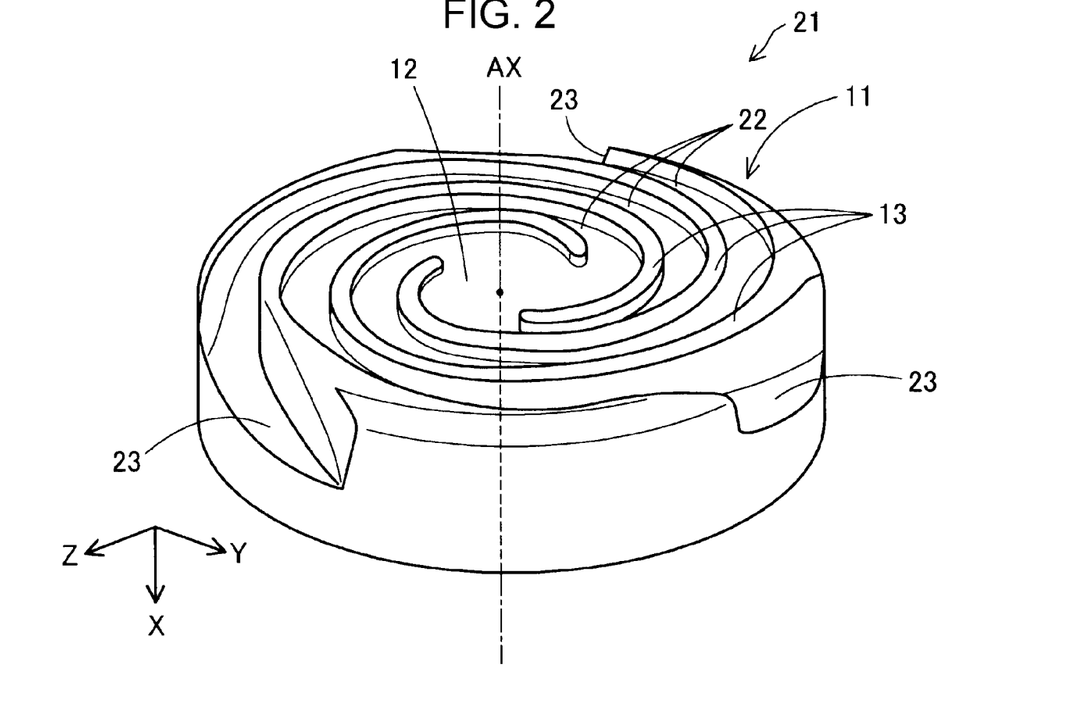
FIG. 2 is a schematic perspective view illustrating a configuration of a flat screw.

FIG. 2 is a schematic perspective view illustrating a configuration of the end surface 11 of the flat screw 21. The end surface 11 of the flat screw 21 has a center portion 12 that is a recessed portion connected to one end of the groove 22. The center portion 12 faces a through hole 26 of the screw facing member 25 illustrated in FIG. 1. In this embodiment, the center portion 12 intersects with the axis AX. The groove 22 of the flat screw 21 is a scroll groove, and is formed in a spiral form to plot an arc from the center portion at which the axis AX is located toward the outer peripheral surface of the flat screw 21. The groove 22 may be formed in a helical form. The end surface 11 is provided with a protruding thread 13 that constitutes a side wall portion of the groove 22 and that extends along the groove 22.

The end surface 11 of the flat screw 21 according to this embodiment has three grooves 22 and three protruding threads 13. However, the number is not limited to three. A desirable number of, that is, one, or two or more grooves 22 and one, or two or more protruding threads 13 may be formed. Alternatively, a desirable number of protruding threads 13 may be provided to meet the number of the grooves 22. In addition, the outer peripheral surface of the flat screw 21 in this embodiment has three material inlets 23 that are equally spaced in the circumferential direction. The number is not limited to three. A desirable number of, that is, one, or two or more material inlets 23 may be formed. The material inlets 23 do not have to be equally spaced and may be spaced at mutually different distances.

The screw facing member 25 illustrated in FIG. 1 has a substantially discoid external shape, and is disposed to face the end surface 11 of the flat screw 21. The screw facing member 25 has embedded therein a heating member (not illustrated) for heating the material. The screw facing member 25 has the through hole 26 extending therethrough along the axis AX. The through hole 26 functions as a channel that guides the molding material to the hot runner 100. The screw facing member 25 has an injection cylinder 32 extending along an axis that is orthogonal to the axis AX. The injection cylinder 32 defines a portion of the injection unit 30, and communicates with the through hole 26.

Figure 3:
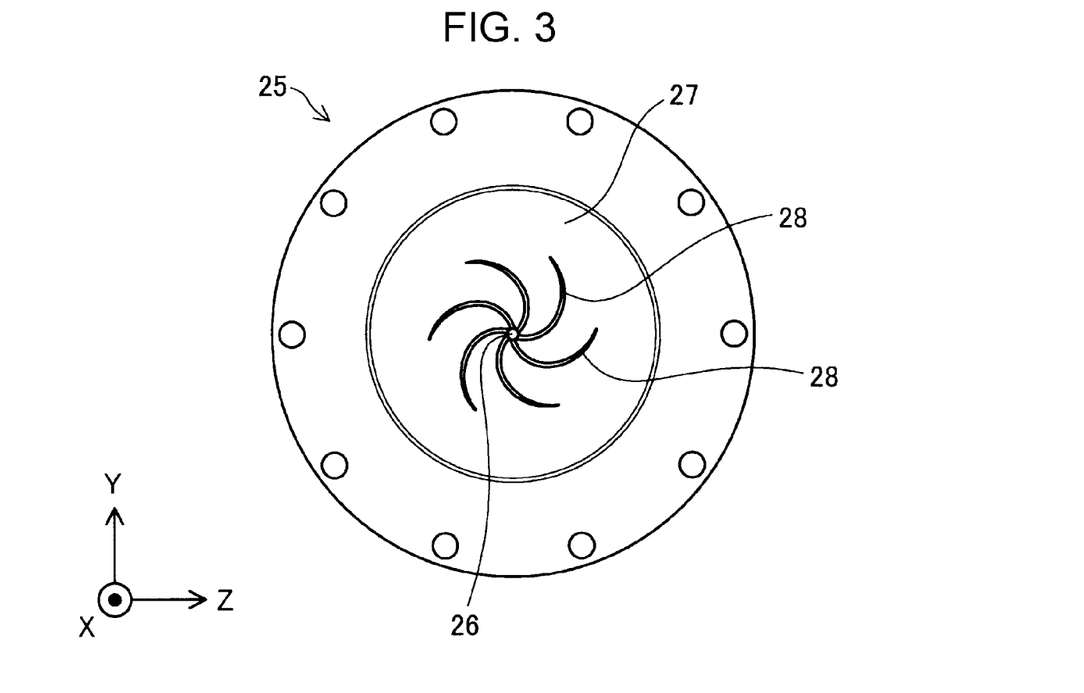
FIG. 3 is a schematic plan view illustrating a configuration of a screw facing member.

FIG. 3 is a schematic plan view illustrating a configuration of the screw facing member 25. FIG. 3 illustrates a screw facing surface 27 of the screw facing member 25. The screw facing surface 27 is disposed to face the end surface 11 of the flat screw 21. The through hole 26 is formed at the center of the screw facing surface 27. The screw facing surface 27 has a plurality of guide grooves 28 connected to the through hole 26 and extending in a spiral form toward the outer periphery from the through hole 26. The plurality of guide grooves 28 have a function of guiding the molding material flowing into the center portion 12 of the flat screw 21 to the through hole 26.

The driving motor 29 illustrated in FIG. 1 is coupled to an end surface of the flat screw 21 on the side opposite to the side that the flat screw 21 faces the screw facing member 25. The driving motor 29 is driven in response to a command from a control unit 95, and rotates the flat screw 21 around the axis AX as a rotation axis.

At least a portion of the material supplied from the material inlets 23 is transported while being heated in the grooves 22 of the flat screw 21 by the heating member of the screw facing member 25 and while being plasticized and melted to be increased in fluidity by the rotation of the flat screw 21. The transported material is guided to the through hole 26. The rotation of the flat screw 21 also causes the molding material to be compressed and degassed.

The injection unit 30 measures the molding material supplied from the material formation unit 20, and injects the measured molding material to a cavity 49 formed in a movable mold 48 of the injection-molding mold 40. The injection unit 30 has the injection cylinder 32, an injection plunger 34, a check valve 36, an injection motor 38, and the hot runner 100.

The injection cylinder 32 having a substantially cylindrical shape is formed in the screw facing member 25, and communicates with the through hole 26. The injection plunger 34 is slidably disposed in the injection cylinder 32. When the injection plunger 34 slides vertically upward, the molding material in the through hole 26 is pulled into the injection cylinder 32 and measured. When the injection plunger 34 slides vertically downward, the molding material in the injection cylinder 32 is fed with a pressure toward the hot runner 100, and the molding material is injected to the cavity 49. The check valve 36 is disposed in the through hole 26, at a position nearer to the flat screw 21 than a position at which the injection cylinder 32 communicates with the through hole 26. The check valve 36 allows the molding material to flow from the flat screw 21 toward the hot runner 100, but inhibits the molding material from flowing backward from the hot runner 100 toward the flat screw 21. When the injection plunger 34 slides vertically downward, the spherical valve body of the check valve 36 moves toward the flat screw 21 and hence closes the through hole 26. The injection motor 38 is driven in response to a command from the control unit 95, and causes the injection plunger 34 to slide in the injection cylinder 32. The sliding speed and the sliding amount of the injection plunger 34 are previously set in accordance with, for example, the kind of molding material and the size of the cavity 49. The hot runner 100 has a function of guiding the molding material in the heated state to the cavity 49. The hot runner 100 will be described later in detail.

The injection-molding mold 40 has a fixed mold 41 and a movable mold 48. The fixed mold 41 has therein a hot runner attachment hole 42 that extends through the fixed mold 41 along the axis AX. The hot runner 100 is disposed in the hot runner attachment hole 42.

Figure 4:
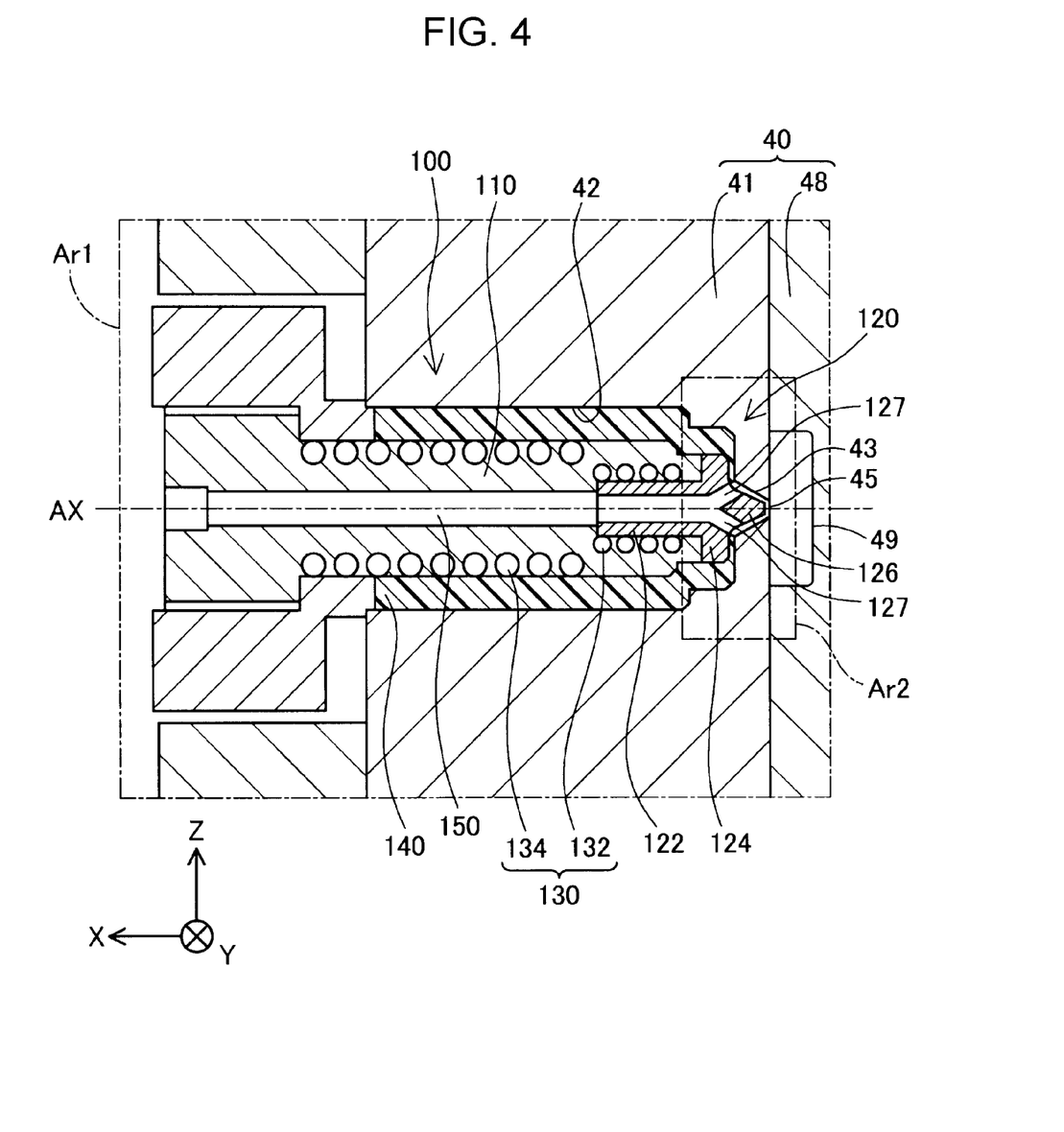
FIG. 4 is an enlarged sectional view illustrating an area Ar1 in FIG. 1 in an enlarged manner.

FIG. 4 is an enlarged sectional view illustrating an area Ar1 in FIG. 1 in an enlarged manner. The hot runner attachment hole 42 has an inner diameter that decreases stepwise from a portion thereof near the material formation unit 20. An end portion 43 of the hot runner attachment hole 42 opposite to the portion thereof near the material formation unit 20 has a substantially conical shape having an inner diameter that gradually decreases. A tip end side of the end portion 43 functions as a gate opening 45 into which the molding material flows. The gate opening 45 is formed as a substantially circular hole. The gate opening 45 has an open gate structure of a ring gate, as described later.

The movable mold 48 illustrated in FIGS. 1 and 4 is disposed to face the fixed mold 41. The movable mold 48 comes into contact with the fixed mold 41 during mold closing and mold clamping including injection and cooling of the molding material, and is separated from the fixed mold 41 during mold opening including mold parting of a molded product. The cavity 49 communicating with the gate opening 45 is formed between the fixed mold 41 and the movable mold 48 because the fixed mold 41 comes into contact with the movable mold 48. The cavity 49 is previously designed to have the shape of a molded product to be molded by injection molding. In this embodiment, the cavity 49 is formed directly continuously to the gate opening 45. However, the cavity 49 may be formed continuously via a runner.

In this embodiment, the injection-molding mold 40 is formed of an Invar material. The Invar material has a characteristic of an extremely small thermal expansion coefficient. In addition, the injection-molding mold 40 has a refrigerant channel (not illustrated). A refrigerant such as cooling water is fed through the refrigerant channel. Thus, the temperature of the injection-molding mold 40 is held at a temperature lower than the melting temperature of the resin, and the molding material injected to the cavity 49 is cooled and hardened. The refrigerant is also fed during mold clamping and mold opening. The molding material may be cooled and hardened by using a desirable cooling method, such as using a Peltier element, instead of feeding the refrigerant through the refrigerant channel.

The mold opening/closing unit 50 illustrated in FIG. 1 opens and closes the fixed mold 41 and the movable mold 48. The mold opening/closing unit 50 has a mold opening/closing motor 58 and an ejector pin 59. The mold opening/closing motor 58 is driven in response to a command from the control unit 95, and moves the movable mold 48 along the axis AX. Thus, mold closing and mold clamping, and mold opening of the injection-molding mold 40 are provided. The ejector pin 59 is disposed at a position at which the ejector pin 59 communicates with the cavity 49. The ejector pin 59 ejects a molded product during mold opening and hence parts the molded product from the injection-molding mold 40.

The control device 90 controls the entire operation of the injection molding apparatus 10 to execute injection molding. The control device 90 is constituted of a computer having a central processing unit (CPU), a memory, and an input/output interface. The CPU executes a control program previously stored in the memory and hence functions as the control unit 95. As described later, the control unit 95 controls the temperature of a heater 130 embedded in the hot runner 100 to adjust the temperature of the hot runner 100. A user of the injection molding apparatus 10 operates a controller that is the input/output interface of the control device 90, and hence can make various settings relating to injection molding conditions such as a setting temperature of the heater 130.

The hot runner 100 guides the molding material that is supplied from the injection unit 30 and that is in the heated state, to the gate opening 45. The hot runner 100 is disposed in the hot runner attachment hole 42 of the fixed mold 41. As illustrated in FIG. 4, the hot runner 100 has a main body 110, a nozzle 120, the heater 130, and a heat insulator 140.

The main body 110 has a substantially cylindrical external shape. The main body 110 has an internal thread (not illustrated) at the inner peripheral surface of an end portion thereof near the gate opening 45. The nozzle 120 is fixedly disposed at an end portion of the hot runner 100 near the gate opening 45. The nozzle 120 has a coupling portion 122, a flange portion 124, and a tip end portion 126. The coupling portion 122 is located near the material formation unit 20 in the nozzle 120, and has a substantially cylindrical external shape. An external thread (not illustrated) is formed at the outer peripheral surface of the coupling portion 122. The external thread is screwed to the internal thread formed at the main body 110, and hence the nozzle 120 is fixed to the main body 110. The flange portion 124 has a larger outer diameter than the outer diameter of the coupling portion 122, and is continuous to the coupling portion 122. An end surface of the flange portion 124 near the material formation unit 20 is in contact with an end surface of the main body 110 near the gate opening 45. The tip end portion 126 is continuous to the flange portion 124, and has a substantially conical external shape protruding toward the gate opening 45.

The channel 150 is formed in the main body 110 and in the nozzle 120. The channel 150 extends along the axis AX. The channel 150 has a function of guiding the molding material to the gate opening 45. The channel 150 is branched at a nozzle opening 127 formed at the tip end portion 126 of the nozzle 120. The nozzle opening 127 faces the end portion 43 of the hot runner attachment hole 42. In this embodiment, the tip end portion 126 has two nozzle openings 127 equally spaced from each other in the circumferential direction. However, the number of the nozzle openings 127 is not limited to two, and a desirable number of nozzle openings 127, such as four nozzle openings 127, may be formed. With this structure, the channel 150 has a ring shape centered on the tip end portion 126, between the tip end portion 126 and the end portion 43 when viewed in the direction of the axis AX. The gate opening 45 has an open gate structure that is also referred to as a ring gate. With the open gate structure, the channel 150 is not closed even when the molding material is hardened, and the gate opening 45 is constantly open.

In this embodiment, the main body 110 and the nozzle 120 are formed of aluminum. Aluminum has characteristics of a relatively large thermal expansion coefficient and a relatively large thermal conductivity.

The heater 130 is constituted of a coil heater embedded in the main body 110. The heater 130 heats the hot runner 100. The temperature of the heater 130 is controlled by the control unit 95. The heating by the heater 130 keeps the melted state of the molding material flowing through the channel 150. The heater 130 includes a first heater 132 and a second heater 134. The first heater 132 is disposed around the nozzle 120 to surround the coupling portion 122, and heats the nozzle 120. The second heater 134 is disposed farther from the nozzle 120 than the first heater 132. In this embodiment, the second heater 134 is disposed at an outer peripheral portion of the main body 110, at a position nearer to the material formation unit 20 than the nozzle 120. The first heater 132 and the second heater 134 are not limited to the coil heaters, and may be constituted of desirable heaters such as band heaters.

The heat insulator 140 is located at a gap that is included in gaps among the main body 110, the nozzle 120, and the hot runner attachment hole 42, and that is located nearer to the material formation unit 20 than the end portion 43. The heat insulator 140 suppresses transmission of heat of the hot runner 100 to the fixed mold 41. In this embodiment, the heat insulator 140 is formed of the same resin material as the molding material; however, the heat insulator 140 may be formed of a desirable material having a relatively small thermal conductivity, or may be a space.

Figure 5:
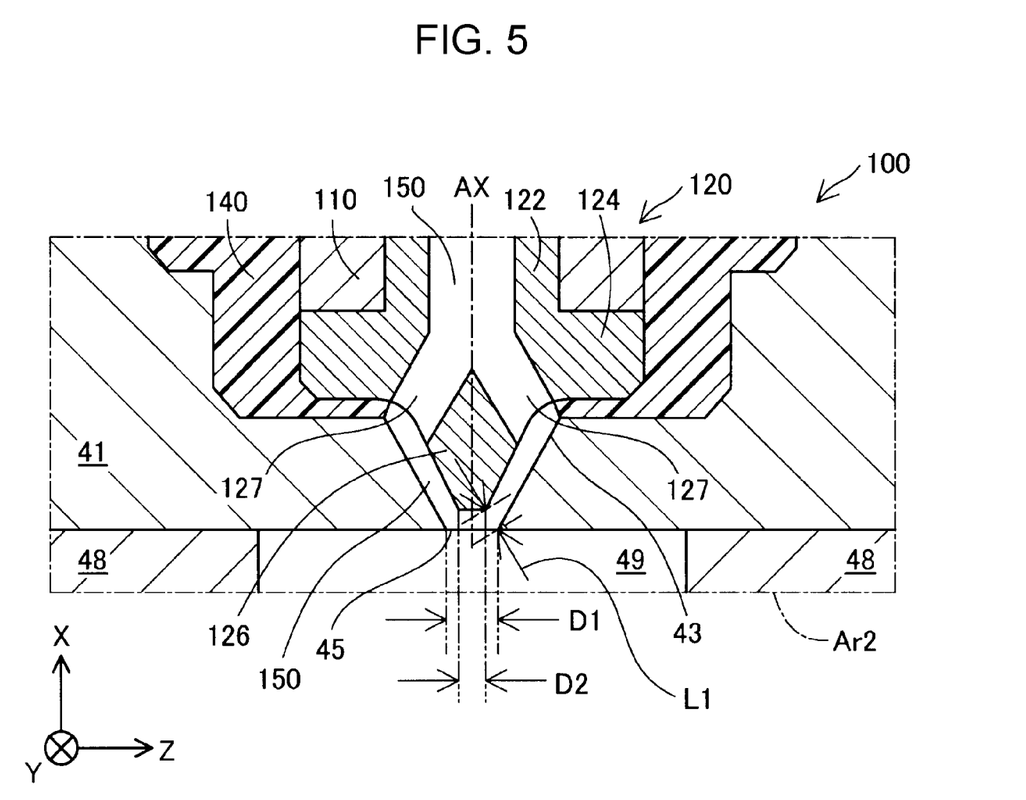
FIG. 5 is a sectional view for explaining dimensions of a gate opening and its periphery.

FIG. 5 is a sectional view for explaining the dimensions of the gate opening 45 and its periphery. FIG. 5 schematically illustrates an area Ar2 in FIG. 4 in an enlarged manner. The dimensions described below represent the dimensions at a control temperature when the molding material is injected from the hot runner 100 to the cavity 49. In this embodiment, a diameter D1 of the gate opening 45 centered on the axis AX is set to about 0.2 mm. In addition, a diameter D2 of the tip end portion 126 of the nozzle 120 centered on the axis AX is set to about 0.05 mm. Further, a narrowest dimension L1 that is the smallest dimension among the dimensions of the gap between the tip end portion 126 of the nozzle 120 and the gate opening 45 is set to about 0.2 mm. In this embodiment, the gap between the tip end portion 126 of the nozzle 120 and the gate opening 45 represents the gap between the tip end portion 126 of the nozzle 120 and an edge of the gate opening 45 formed at the fixed mold 41.

A-2. Injection Molding Material

The material that is used for the injection molding apparatus 10 is described. The injection molding apparatus 10 can perform injection molding using, as a main material, any of various materials, such as a thermoplastic material, a metal material, and a ceramic material. In this case, "a main material" represents a material mainly constituting the shape of the molded product, and represents a material with a content of 50 wt % or more in the molded product. The above-described molding materials include a material in which such a single main material is melted and a material in which such a main material and a partially contained component are melted into a paste form.

When a thermoplastic material is used as a main material, the material formation unit 20 plasticizes the material to form the molding material. "Plasticizing" represents applying heat to a thermoplastic material and melting the material.

The thermoplastic material may be, for example, a thermoplastic resin material of one kind of materials or obtained by combining two or more kinds of materials selected from those listed below.

Examples of Thermoplastic Resin Materials

General-purpose engineering plastics, such as polypropylene resin (PP), polyethylene resin (PE), polyacetal resin (POM), polyvinyl chloride resin (PVC), polyamide resin (PA), acrylonitrile butadiene styrene resin (ABS), polylactic resin (PLA), polyphenylene sulfide resin (PPS), polyetheretherketone (PEEK), polycarbonate (PC), denatured polyphenylene ether, polybutylene terephthalate, and polyethylene terephthalate; and engineering plastics, such as polysulfone, polyethersulfone, polyphenylene sulfide, polyarylate, polyimide, polyamideimide, polyetherimide, and polyetheretherketone.

The thermoplastic material may be mixed with, for example, a pigment, a metal, or a ceramic. Moreover, an additive, such as a wax, a fire retardant, an antioxidant, or a thermostabilizer, may be mixed. Furthermore, a fiber, such as a carbon fiber, a glass fiber, a cellulose fiber, or an aramid fiber, may be mixed.

The thermoplastic material is desirably injected from the nozzle 120 of the hot runner 100 in a state in which the thermoplastic material is heated to a glass transition temperature or higher and completely melted. For example, an ABS resin having a glass transition temperature of about 120° C. may be injected at about 200° C. as a first temperature (described later).

The injection molding apparatus 10 may use, for example, at least one of the metal materials listed below instead of the above-described thermoplastic material. In this case, it is desirable to mix a component that is melted when the molding material is formed, into a powder material that is the metal material in a powder form, and to supply the mixed material to the material formation unit 20.

Examples of Metal Materials

A single metal selected from magnesium (Mg), iron (Fe), cobalt (Co), chromium (Cr), aluminum (Al), titanium (Ti), copper (Cu), and nickel (Ni); and an alloy containing at least one of the metals.

Examples of Alloys

Maraging steel, stainless steel, a cobalt-chromium-molybdenum alloy, a titanium alloy, a nickel alloy, an aluminum alloy, a cobalt alloy, and a cobalt-chromium alloy.

The injection molding apparatus 10 can use a ceramic material as a main material instead of the above-descried metal material. Examples of the ceramic material include oxide ceramics, such as silicon dioxide, titanium dioxide, aluminum oxide, and zirconium oxide; and non-oxide ceramics such as aluminum nitride.

The powder material of the metal material or the ceramic material supplied to the material formation unit 20 may be a mixed material obtained by mixing plural kinds of single metal powder, single alloy powder, and single ceramic material powder. Moreover, the powder material of the metal material or the ceramic material may be, for example, coated with a thermoplastic resin like one described above or another thermoplastic resin. In this case, in the material formation unit 20, the thermoplastic resin may be melted and exhibits fluidity.

The powder material of the metal material or the ceramic material to be supplied to the material formation unit 20 can be added with, for example, a solvent that is one of those listed below. The solvent may contain one, or two or more kinds selected from the following list, in a combined manner.

Examples of Solvents

Water; (poly)alkylene glycol monoalkyl ethers, such as ethylene glycol monomethyl ether, ethylene glycol monoethyl ether, propylene glycol monomethyl ether, and propylene glycol monoethyl ether; acetic esters, such as ethyl acetate, n-propyl acetate, iso-propyl acetate, n-butyl acetate, and iso-butyl acetate; aromatic hydrocarbons, such as benzene, toluene, and xylene; ketones, such as methyl ethyl ketone, acetone, methyl isobutyl ketone, ethyl-n-butyl ketone, diisopropyl ketone, and acetylacetone; alcohols, such as ethanol, propanol, and butanol; tetraalkylammonium acetates; sulfoxide-based solvents of such as dimethyl sulfoxide and diethyl sulfoxide; pyridine-based solvents of such as pyridine, γ-picoline, and 2,6-lutidine; tetraalkylammonium acetate (for example, tetrabutylammonium acetate); and an ion fluid of such as butyl carbitol acetate.

In addition, the powder material of the metal material or the ceramic material to be supplied to the material formation unit 20 can be added with, for example, a binder that is one of those listed below.

Examples of Binders

Acrylic resin, epoxy resin, silicone resin, cellulose-based resin, and another synthetic resin; and PLA, PA, PPS, PEEK, and another thermoplastic resin.

A-3. Injection Molding Method

An injection molding method according to this embodiment thermally expands the nozzle 120 by temperature control on the heater 130, narrows the gap between the nozzle 120 and the gate opening 45, and hence suppresses occurrence of cobwebbing. Cobwebbing represents that the molding material is not cut at the gate opening 45 during mold opening, and extends in a string shape. When cobwebbing occurs, a string-shaped resin or a protrusion appears at the gate of a molded product, thereby degrading the appearance of the molded product; or a string-shaped resin may adhere to the injection-molding mold 40. When molded products are injection molded continuously by a plurality of shots, adhesion of the string-shaped resin to the injection-molding mold 40 causes the string-shaped resin to be transferred to another molded product of the next shot, thereby degrading the appearance of the molded products.

Figure 6:
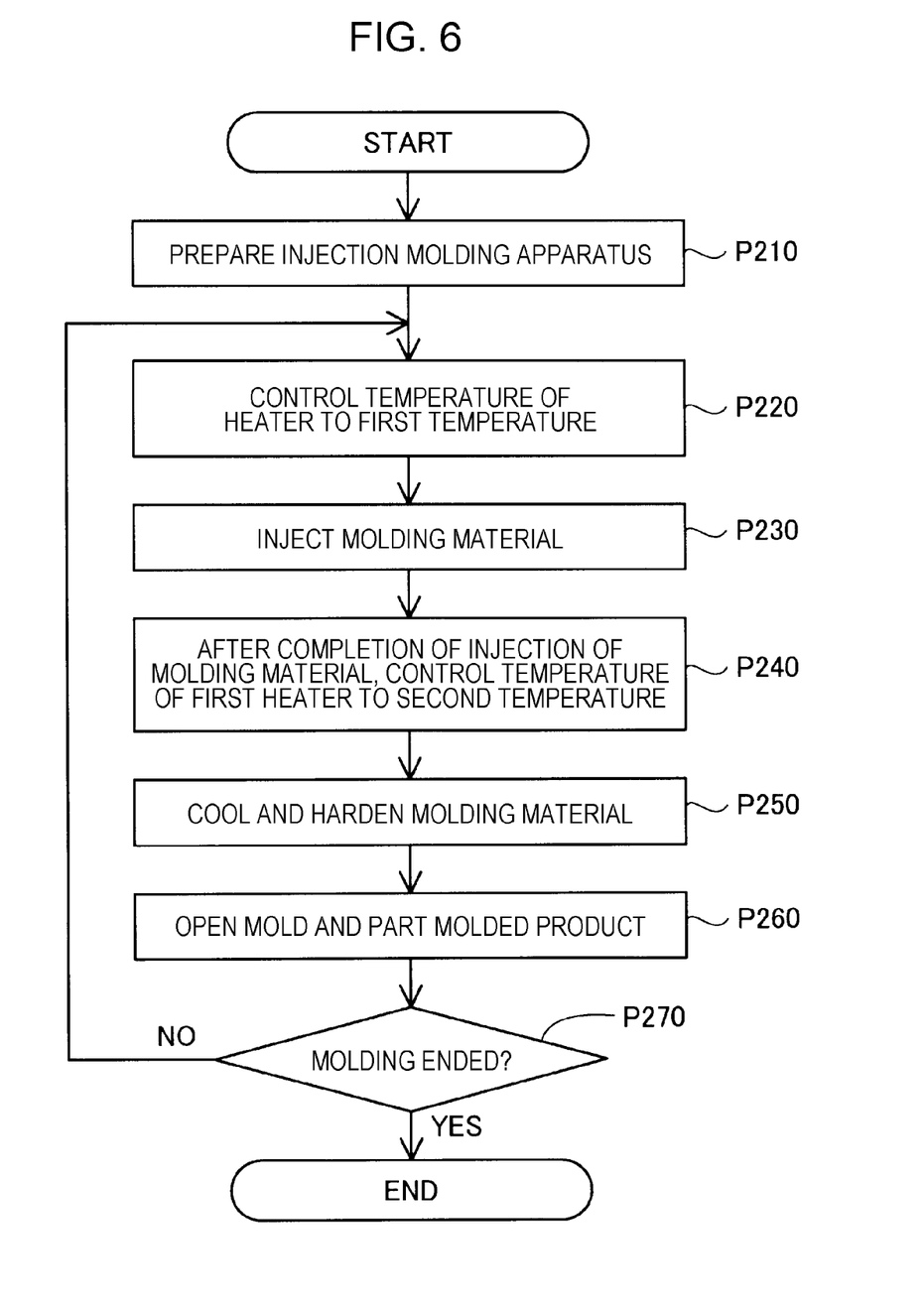
FIG. 6 is a flowchart illustrating a procedure of an injection molding method.

FIG. 6 is a flowchart illustrating a procedure of the injection molding method. The injection molding apparatus 10 having the above-described configuration is prepared (step P210). In step P210, the injection molding apparatus 10 is in a state in which a refrigerant flows through the refrigerant channel of the injection-molding mold 40.

The temperature of the heater 130 is controlled to the first temperature (step P220). "Control to the first temperature" represents control while the first temperature serves as a target temperature. In step P220, the control unit 95 controls the temperatures of the first heater 132 and the second heater 134 to the first temperature. The first temperature corresponds to the temperature of the hot runner 100 when the hot runner 100 injects the molding material. The first temperature is previously set in accordance with the molding material to be used. For example, when an ABS resin is used as the molding material, the first temperature may be set to about 200° C.

The molding material is injected from the hot runner 100 to the cavity 49 (step P230). Step P230 is an injection step, and is executed simultaneously with step P220. Thus, when the molding material is injected from the hot runner 100 to the cavity 49, the temperature of the heater 130 is set to the first temperature. In step P230, the molding material to be supplied to the hot runner 100 is the molding material that is melted and formed by the material formation unit 20. Step P230 is executed in a state in which the fixed mold 41 and the movable mold 48 of the injection-molding mold 40 are clamped. In step P230, when the injection plunger 34 slides vertically upward, the molding material is measured, and the molding material flows into the injection cylinder 32. When the injection plunger 34 slides vertically downward, the molding material in the injection cylinder 32 is fed with a pressure toward the hot runner 100, and the molding material is injected from the hot runner 100 via the gate opening 45 to the cavity 49. Step P230 may include a pressure holding step of applying a pressure to the molding material, hence compressing the molding material, and adding the molding material into the cavity 49. With step P230, the cavity 49 is filled with a predetermined amount of the molding material. In this embodiment, a situation "when the molding material is injected from the hot runner 100 to the cavity 49" represents a situation when the injection plunger 34 slides vertically downward, hence the predetermined amount of the molding material flows into the gate opening 45 via the hot runner 100, and the cavity 49 is filled with the molding material. In other words, the situation represents a situation when the molding material passes through the gate opening 45.

After step P230 is completed, that is, after the injection of the molding material is completed, the temperature of the first heater 132 is controlled to the second temperature (step P240). In this embodiment, a situation "after the injection of the molding material is completed" represents a situation after the cavity 49 is filled with the predetermined amount of the molding material. Thus, "after the injection of the molding material is completed", the injection plunger 34 does not slide vertically downward, and the molding material does not flow into the gate opening 45. Moreover, "control to the second temperature" represents control while the second temperature serves as a target temperature. In step P240, the control on the second heater 134 to the first temperature is continued. The second temperature is a temperature higher than the first temperature. The nozzle 120 can be thermally expanded and extended toward the gate opening 45 at the second temperature. The second temperature is previously set in accordance with, for example, the first temperature, the molding material to be used, the size of the diameter D1 of the gate opening 45, the size of the diameter D2 of the tip end portion 126 of the nozzle 120, the size of the narrowest dimension L1 between the tip end portion 126 of the nozzle 120 and the gate opening 45, and the length of the nozzle 120 along the axis AX. For example, in this embodiment, the second temperature is set to 270° C. or higher. The temperature control in step P240 is maintained for a previously set period of time. In this embodiment, the temperature control in step P240 is maintained until the completion of step P260 (described later). However, for example, the temperature control in step P240 may be maintained until the completion of step P250 (described later). The nozzle 120 thermally expands and extends toward the gate opening 45 in step P240.

Figure 7:
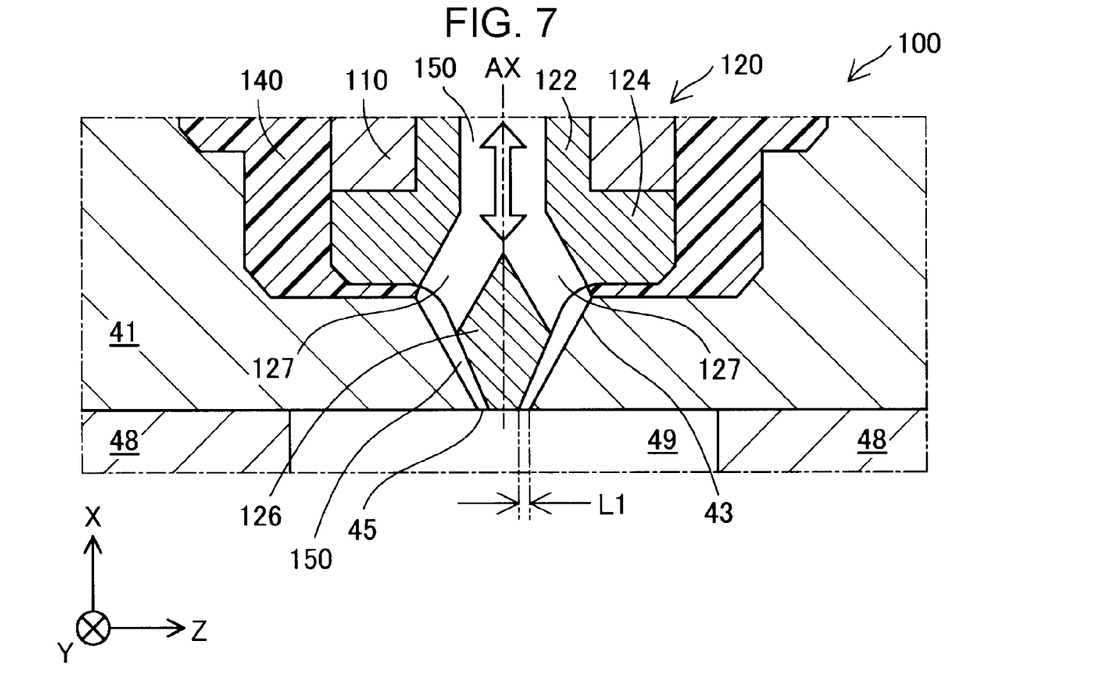
FIG. 7 is an explanatory view illustrating an example of a state in which a nozzle thermally expands.

FIG. 7 is an explanatory view illustrating an example of a state in which the nozzle 120 thermally expands. FIG. 7 illustrates a section similar to FIG. 5. As described above, the nozzle 120 is formed of aluminum having a relatively large thermal expansion coefficient and a relatively large thermal conductivity. Since the nozzle 120 has a large thermal conductivity, when the nozzle 120 is heated in step P240, the heat is easily transmitted in the nozzle 120, and the temperature of the nozzle 120 entirely rises. In addition, since the nozzle 120 has a large thermal expansion coefficient, when the nozzle 120 is heated in step P240, the nozzle 120 largely expands. Thus, the nozzle 120 extends along the axis AX as indicated by a blank arrow in FIG. 7.

While the temperature of the nozzle 120 rises by increasing the temperature of the first heater 132, the heat insulator 140 disposed between the first heater 132 and the fixed mold 41 suppresses the temperature rise of the fixed mold 41. Thus, a change in the dimension of the fixed mold 41 during the control in which the second temperature serves as the target temperature is suppressed. Moreover, as described above, since the injection-molding mold 40 is formed of an Invar material having an extremely small thermal expansion coefficient, the change in dimension depending on the temperature is extremely small. Thus, a change in the dimension of the fixed mold 41 during the control in which the second temperature serves as the target temperature is further suppressed. Since the nozzle 120 extends by heating the nozzle 120, and the change in the position and the change in the dimension of the gate opening 45 formed at the fixed mold 41 are suppressed, the nozzle 120 relatively extends toward the gate opening 45. For example, when the length of the nozzle 120 along the axis AX is 10 mm at the first temperature and the temperature difference between the first temperature and the second temperature is 200° C., changing the temperature from the first temperature to the second temperature causes the length of the nozzle 120 along the axis AX to extend by about 0.05 mm. As described above, since the nozzle 120 extends toward the gate opening 45, the gap between the tip end portion 126 and the gate opening 45 is narrowed. Thus, the narrowest dimension L1 is decreased. This promotes gate cutting. Gate cutting represents cutting of the molding material at the gate opening 45.

As illustrated in FIG. 6, the molding material with which the cavity 49 is filled is cooled and hardened (step P250). Step P250 is a cooling step, which is executed by maintaining the clamped state of the injection-molding mold 40 for a predetermined period of time. Since the refrigerant is already fed to the refrigerant channel of the injection-molding mold 40, the step P250 is executed simultaneously with step P240. Step P250 may be continuously executed even after the completion of step P240.

After the completion of step P250, the injection-molding mold 40 is opened and the molded product is parted from the injection-molding mold 40 (step P260). The control unit 95 determines whether or not the molding is ended or not (step P270). Whether the molding is ended or not may be determined by determining whether or not the injection molding is ended a previously set number of cycles. Alternatively, the determination may be made based on whether or not an end button that ends the injection molding is pressed. If it is determined that the molding is not ended (NO in step P270), the process returns to step P220 and executes the injection molding of the next cycle. The temperature of the first heater 132 and the temperature of the nozzle 120 are decreased because the heat is transmitted to the fixed mold 41. Thus, the temperature of the first heater 132 is decreased from the second temperature to the first temperature and then step P220 of the next cycle can be executed. If it is determined that the molding is ended (YES in step P270), the injection molding is ended.

With the above-described injection molding apparatus 10 according to this embodiment, the temperature of the heater 130 is controlled to the first temperature when the molding material is injected, and after the injection of the molding material is completed, the temperature of the first heater 132 is controlled to the second temperature that is higher than the first temperature. Thus, the nozzle 120 can be thermally expanded and can be relatively extended toward the gate opening 45. Accordingly, the gap between the nozzle 120 and the gate opening 45 can be narrowed, and gate cutting can be promoted. This can suppress occurrence of cobwebbing. In addition, since the occurrence of cobwebbing can be suppressed by the simple configuration, the apparatus configuration does not become complicated. In addition, since the occurrence of cobwebbing can be suppressed, a decrease in the yield of molded products can be suppressed, and the cost required for manufacturing molded products can be decreased. Further, since the occurrence of cobwebbing can be suppressed, the configuration can be suitably applied to injection molding using a molding material which likely causes cobwebbing, such as a polypropylene resin.

Since the temperature of the heater 130 is controlled while the first temperature lower than the second temperature serves as the target temperature when the molding material is injected, the appropriate size of the gap between the nozzle 120 and the gate opening 45 during injection of the molding material can be ensured, and occurrence of inappropriate filling to the cavity 49 can be suppressed. Thus, a decrease in the yield of molded products can be suppressed, and the cost required for manufacturing molded products can be decreased.

In addition, since the first heater 132 is controlled to the second temperature in step P240 while the control on the second heater 134 to the first temperature is continued, the nozzle 120 can be locally heated at a higher temperature in the hot runner 100, and excessive heating of the molding material can be suppressed in the hot runner 100. Accordingly, decomposition of the molding material can be suppressed, and carbonization or a change in characteristics of the molding material can be suppressed.

In addition, since the thermal expansion coefficient of the nozzle 120 is larger than the thermal expansion coefficient of the fixed mold 41, the change in the dimension of the nozzle 120 can be larger than the change in the dimension of the fixed mold 41, and the nozzle 120 can relatively further extend toward the gate opening 45. Accordingly, the gap between the nozzle 120 and the gate opening 45 can be further narrowed. Since the nozzle 120 is formed of aluminum having a large thermal conductivity, the heat is easily transmitted in the nozzle 120 by the heating in step P240, and the temperature can rise entirely in the nozzle 120.

In addition, since the material is melted by the flat screw 21 and hence the molding material is formed, the mechanism that forms the molding material can be decreased in size, and an increase in size of the injection molding apparatus 10 can be suppressed.

B. Second Embodiment

Figure 8:
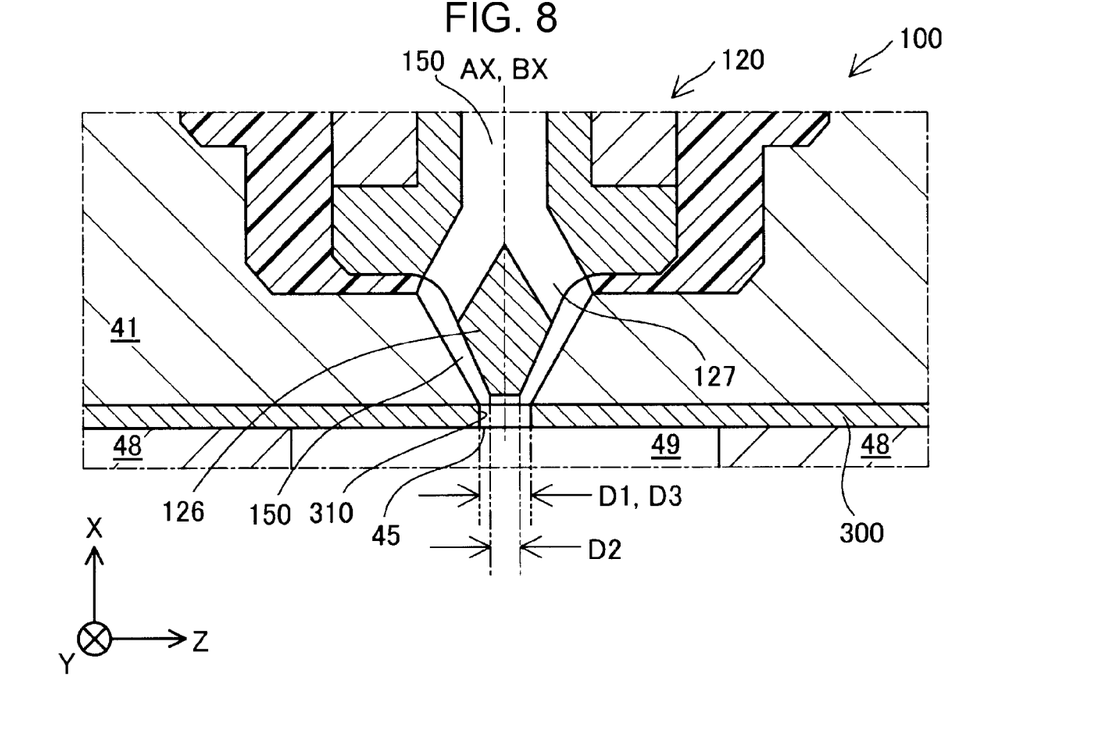
FIG. 8 is a sectional view illustrating a configuration of a primary portion of an injection molding apparatus according to a second embodiment.

FIG. 8 is a sectional view illustrating a configuration of a primary portion of an injection molding apparatus according to a second embodiment. FIG. 8 illustrates a region of the injection molding apparatus similar to the region of FIG. 5. The injection molding apparatus according to the second embodiment differs from the injection molding apparatus 10 of the first embodiment in that the injection molding apparatus according to the second embodiment includes a shutter mechanism 300. The other configuration is similar to that of the first embodiment. The same reference sign is applied to the same configuration and its specific description is omitted.

The shutter mechanism 300 included in the injection molding apparatus according to the second embodiment is constituted of a plate-shaped member and is disposed between the fixed mold 41 and the movable mold 48. The shutter mechanism 300 is slidable in both directions of vertically upward (+Z direction) and vertically downward (−Z direction). The shutter mechanism 300 has a channel hole 310 that extends through the shutter mechanism 300 along the axis AX and that has a substantially circular shape in sectional view. The channel hole 310 functions as a portion of the channel 150 for the molding material that flows from the hot runner 100 into the gate opening 45. In this embodiment, a diameter D3 of the channel hole 310 centered on the axis AX is set to a size substantially the same as the diameter D1 of the gate opening 45. More specifically, the diameter D3 of the channel hole 310 is set to about 0.2 mm. In this embodiment, the shutter mechanism 300 is driven by oil hydraulic driving and slides. The driving is not limited to oil hydraulic driving, and may be any driving system, such as water hydraulic driving, air driving, electric driving, or electromagnetic driving. In this embodiment, the shutter mechanism 300 slides by a displacement amount smaller than the diameter D3 of the channel hole 310. However, the displacement amount is not limited to the value smaller than the diameter D3 of the channel hole 310, and the shutter mechanism 300 may slide by a desirable displacement amount such as an amount equal to or larger than the diameter D3 of the channel hole 310. The displacement amount may be set in accordance with the diameter D1 of the gate opening 45 or the diameter D2 of the tip end portion 126 of the nozzle 120. The timing and the displacement amount of the sliding of the shutter mechanism 300 are controlled by the control unit 95.

With the injection molding method using the injection molding apparatus according to the second embodiment, in step P220 and step P230 illustrated in FIG. 6, the control unit 95 controls the position of the channel hole 310 of the shutter mechanism 300 to the position illustrated in FIG. 8. That is, when the molding material is injected, an axis BX of the channel hole 310 agrees with the axis AX of the nozzle 120 and the gate opening 45.

Figure 9:
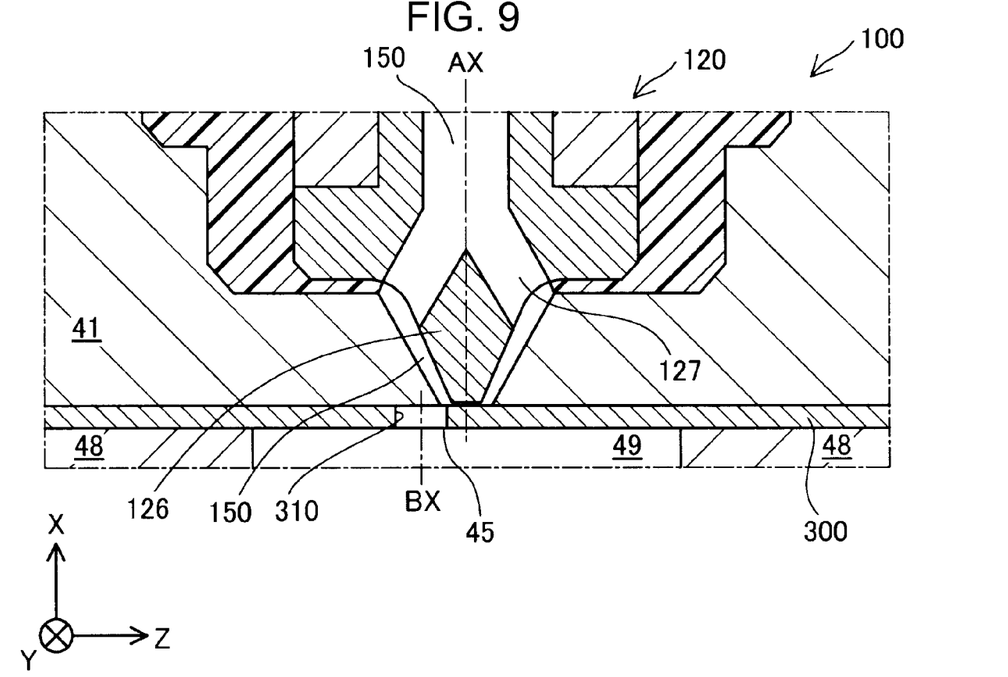
FIG. 9 is a sectional view illustrating a state after sliding of a shutter mechanism.

FIG. 9 is a sectional view illustrating a state after sliding of the shutter mechanism 300. In step P250 illustrated in FIG. 6, the control unit 95 causes the shutter mechanism 300 to slide vertically downward (−Z direction) such that the position of the channel 310 is located at the position illustrated in FIG. 9. That is, after the injection of the molding material is completed, the axis BX of the channel hole 310 is deviated from the axis AX of the nozzle 120 and the gate opening 45. Thus, the channel 150 at the end surface of the shutter mechanism 300 near the nozzle 120 is narrowed. The shutter mechanism 300 may slide vertically downward (−Z direction) at any timing after the injection of the molding material is completed (after step P230 is completed) without being limited to the timing in step P250.

The injection molding apparatus according to the above-described second embodiment can attain advantageous effects similar to those of the injection molding apparatus 10 of the first embodiment. In addition, since the shutter mechanism 300 is provided, the channel 150 can be further narrowed, gate cutting is further promoted, and occurrence of cobwebbing can be further suppressed. In addition, since the shutter mechanism 300 slides by the displacement amount smaller than the diameter D3 of the channel hole 310, the energy required for driving the shutter mechanism 300 can be suppressed.

Figure 10:
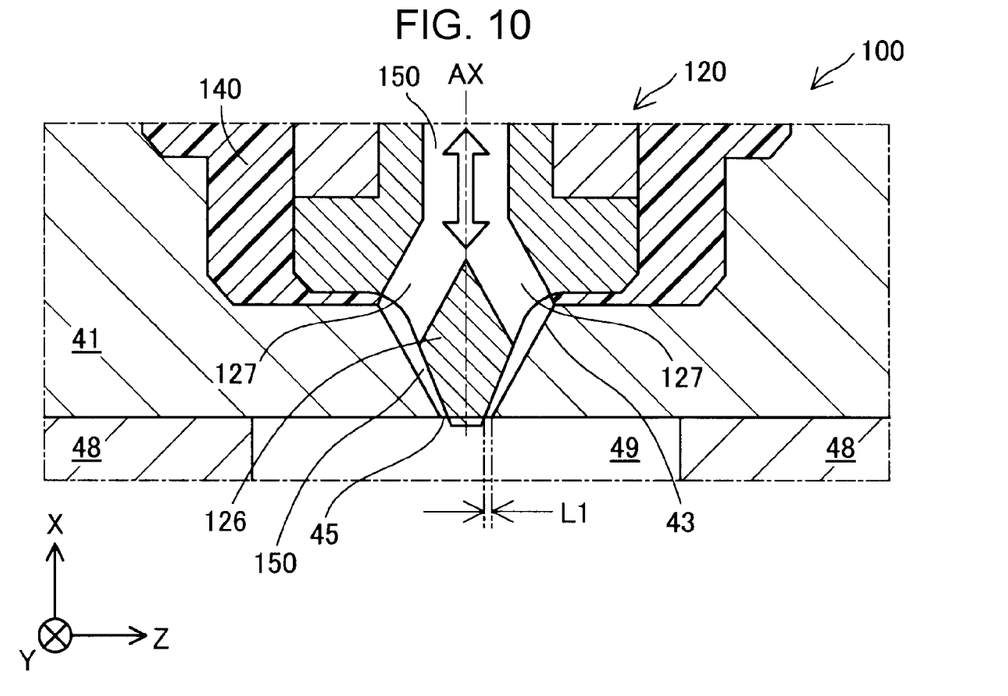
FIG. 10 is an explanatory view illustrating a state in which a nozzle thermally expands according to another embodiment.
Figure 11:
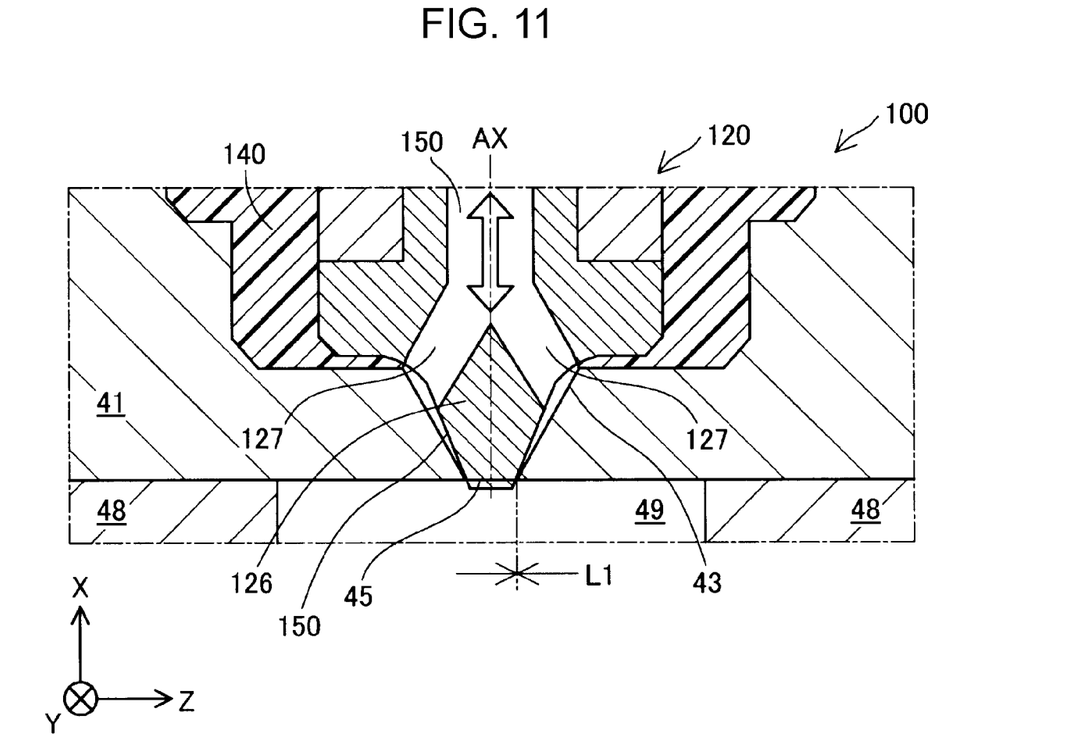
FIG. 11 is an explanatory view illustrating a state in which a nozzle thermally expands according to still another embodiment.

C. Other Embodiments (C1) FIG. 10 and FIG. 11 are explanatory views each illustrating a state in which the nozzle 120 thermally expands according to other embodiments. FIGS. 10 and 11 illustrate a section similar to FIG. 7. In the above description, the nozzle 120 thermally expands to be the state illustrated in FIG. 7. However, the disclosure is not limited thereto. For example, as illustrated in FIG. 10, the second temperature may be set such that the tip end portion 126 of the nozzle 120 is located nearer to the cavity 49 than the gate opening 45 through the control to the second temperature. With this embodiment, the gap between the nozzle 120 and the gate opening 45 can be further narrowed, gate cutting is further promoted, and occurrence of cobwebbing can be further suppressed. In addition, for example, as illustrated in FIG. 11, the second temperature may be set such that the tip end portion 126 of the nozzle 120 closes the gate opening 45 through the control to the second temperature. This embodiment can be provided, for example, by using aluminum for the material of the main body 110 and the nozzle 120 of the hot runner 100, by setting the length of the hot runner 100 along the axis AX to 35 mm at the first temperature, by setting the temperature difference between the first temperature and the second temperature to 250° C., and by controlling the first heater 132 and the second heater 134 while the second temperature serves as the target temperature. With this embodiment, by further narrowing the gap between the nozzle 120 and the gate opening 45, the narrowest dimension L1 can be zero, gate cutting is further promoted, and occurrence of cobwebbing can be further suppressed.

(C2) In the injection molding method of the above-described embodiments, the control to the first temperature is continued on the second heater 134 in step P240; however, the first heater 132 and the second heater 134 may be controlled to the second temperature in step P240. With this configuration, in addition to the thermal expansion of the nozzle 120, the hot runner 100 including a section nearer to the material formation unit 20 than the nozzle 120 can be entirely thermally expanded. The hot runner 100 can be entirely extended, and the gap between the nozzle 120 and the gate opening 45 can be further narrowed. Alternatively, in step P240, the second heater 134 may be controlled to the second temperature, and the first heater 132 may be controlled to the first temperature. With this configuration, the hot runner 100 can be thermally expanded, and the gap between the nozzle 120 and the gate opening 45 can be narrowed.

(C3) In the injection molding apparatus 10 of the above-described embodiments, the heater 130 includes the first heater 132 and the second heater 134. However, one of the first heater 132 and the second heater 134 may be omitted, or may include three of more heaters. With the embodiments including a plurality of heaters, such as the first heater 132 and the second heater 134, the temperature can be controlled by selecting a heater. Thus, the temperature control with a selective heater can increase the degree of freedom for setting the heating conditions in accordance with the kind of the molding material to be used, the lengths of the hot runner 100 and the nozzle 120 along the axis AX, the size of the diameter D1 of the gate opening 45, the size of the diameter D2 of the tip end portion 126 of the nozzle 120, and the size of the narrowest dimension L1 between the tip end portion 126 of the nozzle 120 and the gate opening 45. With this embodiment, for example, the second heater 134 may be controlled to a temperature higher than the first temperature corresponding to the injection temperature, and the first heater 132 may be controlled to a temperature higher than the temperature of the second heater 134 in step P240.

(C4) The materials of the injection-molding mold 40 and the hot runner 100 in the injection molding apparatus 10 of the above-described embodiments are merely examples, and may be modified in various ways. For example, the injection-molding mold 40 may be formed of any metal material, such as any other steel-based material, copper, or brass, instead of an Invar material. In addition, for example, the main body 110 and the nozzle 120 of the hot runner 100 may be formed of a desirable metal material, such as a steel-based material like stainless steel, copper, or brass, instead of aluminum. In addition, the main body 110 and the nozzle 120 may be formed of the same kind of materials, or different kinds of materials. For example, the nozzle 120 may be formed of aluminum and the main body 110 may be formed of a steel-based material. That is, the thermal expansion coefficient of the nozzle 120 may be typically larger than the thermal expansion coefficient of the fixed mold 41. In addition, the injection-molding mold 40 and the hot runner 100 may be formed of the same kind of materials. The thermal expansion coefficient of the nozzle 120 may be the same as or smaller than the thermal expansion coefficient of the fixed mold 41. Even with such a configuration, advantageous effects similar to those of the above-described embodiments are attained.

(C5) The injection molding apparatus 10 according to the above-described embodiments has the flat screw 21 at the material formation unit 20. However, without being limited to the flat screw 21, the molding material may be formed, for example, by melting a material using a screw cylinder or the like having a large length along the axis AX. Even with such a configuration, advantageous effects similar to those of the above-described embodiments can be attained. In addition, the injection molding apparatus 10 according to the above-described embodiments is a horizontal injection molding apparatus 10 in which the axis AX of the channel 150 is orthogonal to the vertical direction. However, the disclosure may be applied to a vertical injection molding apparatus in which the axis AX of the channel 150 is parallel to the vertical direction.

(C6) In the above-described embodiments, the function and processing provided by software may be partly or entirely provided by hardware. In addition, the function and processing provided by hardware may be partly or entirely provided by software. Hardware may be, for example, any one of various circuits, such as an integrated circuit, a discrete circuit, or a circuit module in which at least two of such circuits are combined may be used.

D. Other Aspects

The disclosure is not limited to the above-described embodiments, and may be provided in various aspects within the scope of the disclosure. For example, the disclosure can be provided by the following aspects. The technical features in the above-described embodiments corresponding to the technical features in the aspects described below can be properly exchanged or combined to address part or the entirety of the problems of the disclosure or to attain the part or the entirety of the advantageous effects of the disclosure. In addition, the technical features can be properly omitted unless otherwise noted as being essential in the specification.

(1) An aspect of the disclosure provides an injection molding apparatus. The injection molding apparatus includes an injection-molding mold including a fixed mold and a movable mold, the fixed mold having a gate opening into which a molding material flows, the movable mold having a cavity and being configured to be separated from the fixed mold during mold opening; a hot runner including a nozzle having a channel that guides the molding material to the gate opening, and a heater, the hot runner being disposed in the fixed mold; and a control unit that controls a temperature of the heater to adjust a temperature of the hot runner. The control unit controls the temperature of the heater to a first temperature when the molding material is injected from the hot runner to the cavity, and after the injection of the molding material is completed, controls the temperature of the heater to a second temperature that is higher than the first temperature. A gap between the nozzle and the gate opening when the temperature of the heater is controlled to the second temperature is narrower than the gap when the temperature of the heater is controlled to the first temperature. With the injection molding apparatus according to this aspect, the temperature of the heater is controlled to the first temperature when the molding material is injected, and after the injection of the molding material is completed, the temperature of the heater is controlled to the second temperature that is higher than the first temperature. Thus, the nozzle can be thermally expanded and can be relatively extended toward the gate opening. Accordingly, the gap between the nozzle and the gate opening when the temperature of the heater is controlled to the second temperature can be narrower than the gap when the temperature of the heater is controlled to the first temperature. Gate cutting can be promoted. This can suppress occurrence of cobwebbing.

(2) In the injection molding apparatus according to the aspect, a thermal expansion coefficient of the nozzle may be larger than a thermal expansion coefficient of the fixed mold. With the injection molding apparatus according to this aspect, since the thermal expansion coefficient of the nozzle is larger than the thermal expansion coefficient of the fixed mold, the change in the dimension of the nozzle can be larger than the change in the dimension of the fixed mold. Accordingly, the nozzle can relatively further extend toward the gate opening, and the gap between the nozzle and the gate opening can be further narrowed.

(3) In the injection molding apparatus according to the aspect, the control unit, after the injection of the molding material is completed, may control the temperature of the heater to the second temperature such that a tip end portion of the nozzle near the gate opening is located nearer to the cavity than the gate opening. With the injection molding apparatus according to this aspect, after the injection of the molding material is completed, since the temperature of the heater is controlled to the second temperature such that the tip end portion of the nozzle near the gate opening is located nearer to the cavity than the gate opening, the gap between the nozzle and the gate opening can be further narrowed.

(4) In the injection molding apparatus according to the aspect, the control unit, after the injection of the molding material is completed, may control the temperature of the heater to the second temperature such that a tip end portion of the nozzle near the gate opening closes the gate opening. With the injection molding apparatus according to this aspect, after the injection of the molding material is completed, since the temperature of the heater is controlled to the second temperature such that the tip end portion of the nozzle near the gate opening closes the gate opening, the gap between the nozzle and the gate opening can be further narrowed.

(5) In the injection molding apparatus according to this aspect, the heater may include a first heater that is disposed around the nozzle and that heats the nozzle, and a second heater that is disposed farther from the nozzle than the first heater. With the injection molding apparatus according to this aspect, since the heater includes the first heater that is disposed around the nozzle and that heats the nozzle, and the second heater that is disposed farther from the nozzle than the first heater, the temperature can be controlled by selecting a heater.

(6) In the injection molding apparatus according to this aspect, the control unit, when the molding material is injected from the hot runner to the cavity, controls a temperature of the first heater and a temperature of the second heater to the first temperature, and after the injection of the molding material is completed, controls the temperature of the first heater to the second temperature and controls the temperature of the second heater to the first temperature. With the injection molding apparatus according to this aspect, when the molding material is injected, the temperature of the first heater and the temperature of the second heater are controlled to the first temperature, and after the injection of the molding material is completed, the temperature of the first heater is controlled to the second temperature and the temperature of the second heater is controlled to the first temperature. Accordingly, the nozzle included in the hot runner can be locally heated at a further high temperature, and excessive heating of the molding material can be suppressed.

(7) The injection molding apparatus according to this aspect may further include a material formation unit that has a flat screw configured to rotate and that forms the molding material by melting a material supplied to the flat screw. With the injection molding apparatus according to this aspect, since the injection molding apparatus includes the material formation unit that has the flat screw configured to rotate and that forms the molding material by melting the material supplied to the flat screw, the mechanism that forms the molding material can be decreased in size, and an increase in size of the injection molding apparatus can be suppressed.

The disclosure can be provided in any of various aspects other than the injection molding apparatus. For example, the disclosure can be provided in any of aspects including an injection molding method, a method for controlling an injection molding apparatus, a computer program for providing the injection molding method, a computer program for providing the control method, and a non-transitory storage medium storing such a computer program.

What is claimed is:

1. An injection molding apparatus comprising:
an injection-molding mold including a fixed mold and a movable mold, the fixed mold having a gate opening into which a molding material flows, the movable mold having a cavity and being configured to be separated from the fixed mold during mold opening;
a hot runner including a nozzle having a channel that guides the molding material to the gate opening, and a heater, the hot runner being disposed in the fixed mold; and
a control unit that controls a temperature of the heater to adjust a temperature of the hot runner, wherein
the control unit
controls the temperature of the heater to a first temperature when the molding material is injected from the hot runner to the cavity, and
after the injection of the molding material is completed, controls the temperature of the heater to a second temperature that is higher than the first temperature, and
a gap between the nozzle and the gate opening when the temperature of the heater is controlled to the second temperature is narrower than the gap when the temperature of the heater is controlled to the first temperature.

2. The injection molding apparatus according to claim 1, wherein a thermal expansion coefficient of the nozzle is larger than a thermal expansion coefficient of the fixed mold.

3. The injection molding apparatus according to claim 1, wherein the control unit, after the injection of the molding material is completed, controls the temperature of the heater to the second temperature such that a tip end portion of the nozzle near the gate opening is located nearer to the cavity than the gate opening.

4. The injection molding apparatus according to claim 1, wherein the control unit, after the injection of the molding material is completed, controls the temperature of the heater to the second temperature such that a tip end portion of the nozzle near the gate opening closes the gate opening.

5. The injection molding apparatus according to claim 1, wherein
the heater includes
a first heater that is disposed around the nozzle and that heats the nozzle and
a second heater that is disposed farther from the nozzle than the first heater.

6. The injection molding apparatus according to claim 5, wherein
the control unit,
when the molding material is injected from the hot runner to the cavity, controls a temperature of the first heater and a temperature of the second heater to the first temperature, and
after the injection of the molding material is completed, controls the temperature of the first heater to the second temperature and controls the temperature of the second heater to the first temperature.

7. The injection molding apparatus according to claim 1, further comprising:
a material formation unit that has a flat screw configured to rotate and that forms the molding material by melting a material supplied to the flat screw.

* * * * *